Jan. 1, 1929. 1,697,441
J. WALKER
MACHINE FOR TREATING CHOCOLATE MASSES OR OTHER MATERIALS
Filed June 23, 1925 8 Sheets-Sheet 7

Fig-7-

INVENTOR-
John Walker.
BY
ATTORNEYS=

Patented Jan. 1, 1929.

1,697,441

UNITED STATES PATENT OFFICE.

JOHN WALKER, OF BOSTON, MASSACHUSETTS.

MACHINE FOR TREATING CHOCOLATE MASSES OR OTHER MATERIALS.

Application filed June 23, 1925. Serial No. 38,978.

The invention relates to a machine for treating chocolate masses or other materials.

The general object of the invention is to effect economies in space, time, power and labor by providing a machine capable of performing the several operations of mixing, grinding, finishing and tempering the materials treated,—operations which for the most part have hitherto been accomplished by separate machines.

Especially it is the object of the invention to provide a machine for treating chocolate masses in which the cocoa bean forms the essential ingredient, and by which machine the following advantages are obtained in the treatment of such masses:—

The elimination of practically all the machinery customarily employed in the manufacture of chocolate and the doing in the one machine of what has hitherto been done by a considerable number of machines, roasters, mills, melangers, refiners or grinders, pulverizers, tanks and kettles, to say nothing of saving in floor space and labor costs.

The preliminary roasting of the cocoa bean is avoided or rendered unnecessary, which by reason of the high temperature employed in such roasting tends to injure fats in the bean and weaken its natural flavors.

The bean and all the ingredients contained in the mass are combined and treated in the one machine in the presence of the liquor obtained in the reduction of the bean in such machine.

Granulated sugar instead of pulverized sugar may be used and reduced to impalpable fineness in the machine, and its sweetness hitherto lost by pulverizing is retained. Likewise vanilla beans are reduced in the machine and their natural flavor retained.

The machine permits of the mass being properly cooked at a relatively low temperature or at one which will not injure the delicate flavors residing in the mass. In other words, simultaneously with the amalgamation and reduction of the various ingredients in the mass the mass may be effectively cooked at a low temperature.

The elements entering into the mass may be reduced to any desired degree of fineness, and operations can be carried on and the mass tempered at any desired degree of temperature.

The invention can best be seen and understood by reference to the drawings, in which—

Fig. 7 is a longitudinal vertical section of one of the grinders hereinafter referred to.

Referring to the drawings:—

1 represents a tank having spaced parallel sides 2 and 3 and a substantially flat bottom 4 which runs or merges into curvilinear ends 5 and 6, all preferably cast of integral structure. The tank has exterior to its bottom 4 and spaced from it a flanged jacket 7 which makes closed connection with the bottom on all sides and forms between it and the bottom a chamber 8 through which a heating or cooling fluid is directed to pass, as will later be explained, for assisting in heating or cooling the contents of the tank. The jacket 7 forms a rest for the tank and is preferably provided on either side with feet 9 on which the tank stands.

Figure 4:
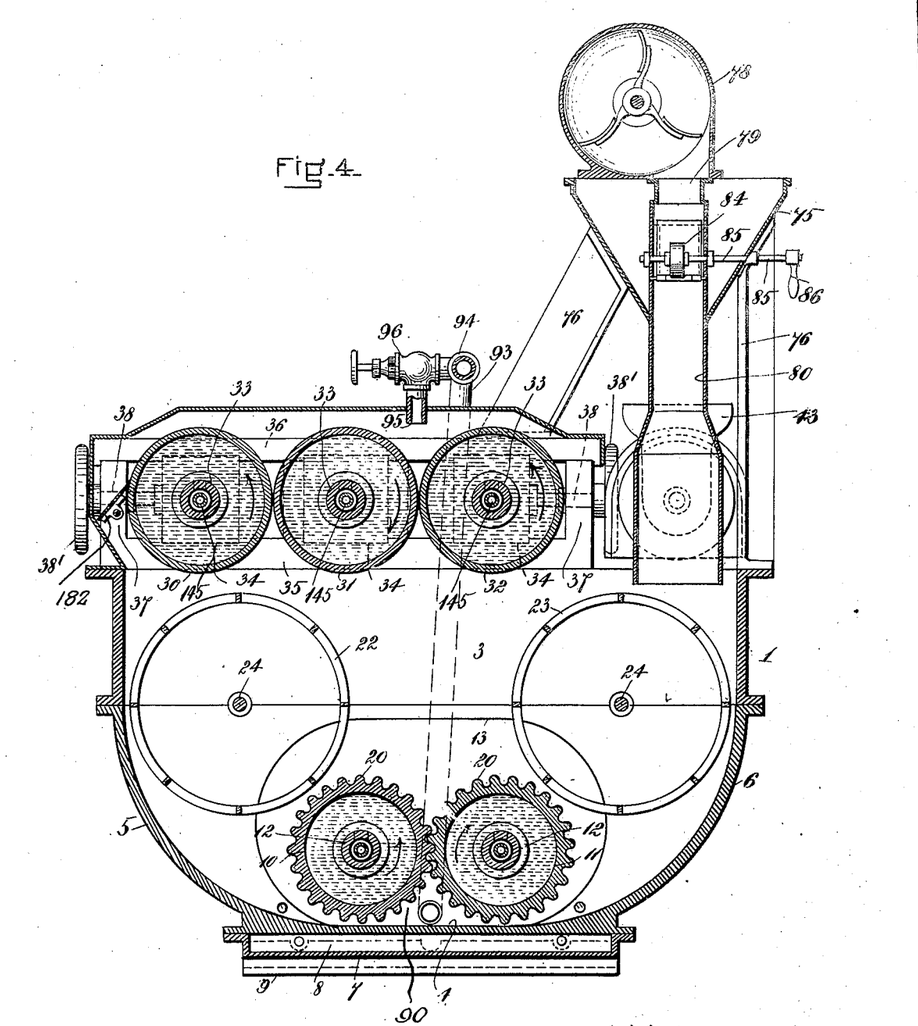
Fig. 4 is a section on the line 4—4 of Fig. 3.

Located within the tank are rolls 10 and 11, respectively (see Fig. 4). Each of these rolls is mounted upon a shaft 12 to which the roll is fixed. In order to permit of an easy mounting of the rolls within the tank, the opposite sides of the tank have openings in them and these openings are each covered by a header 13 bolted or otherwise secured to the side of the tank (see Fig. 5). The shaft 12 of the respective rolls pass through these headers and turn in bearings 14. These bearings are each provided with an interior bushing 15 and are provided also with a squared end portion or head 16 contained between flanges 17 on the exterior of each of the respective headers, which form ways in which the heads of the respective bearings are adapted to slide and permit of the rolls being adjustable toward and away from one another and their relative engaging positions determined. The bearings are positioned and held in any determinate position by means of adjusting screws 18 passed through the flanges 17 and are adjustable thereon. In order that the contents of the tank may not escape through the headers into the joint between the shafts of the rolls and their respective bearings, packing boxes 19 are socketed within the respective headers to embrace the shaft, these boxes lying between the bearings for the shaft and the interior or chamber of the tank.

The rolls 10 and 11 are toothed rolls, each roll being provided on its exterior with a series of teeth 20. The teeth are relatively large and rounded with rounded interdental spaces between them whereby the teeth on one roll will enter the spaces between the teeth on the other roll and turn therein with a wiping or rubbing action as the rolls are driven one by the other through engagement of their teeth. The interdental spaces into which the teeth fit are made slightly larger than the teeth in order that the material to be treated may enter these spaces and be ground or milled by the wiping action of the teeth as the rolls are turned.

The rolls 10 and 11 are centrally located engaging one another in the lower part of the tank on opposite sides of the median line of the tank, the rolls occupying positions in which their teeth will just clear the bottom of the tank as the rolls are rotated with the ends of the rolls practically flush with the sides of the tank.

Located also within the tank are combined stirrers and beaters 22 and 23, respectively. These stirrers and beaters are located at the opposite ends of the tank in position above and oblique with relation to the rolls 10 and 11 and are mounted each on a shaft 24 which turns in bearings 25 on the opposite sides of the tank.

Mounted upon the tank so as to lie fairly well above its contents are a series of milling rolls 30, 31 and 32, respectively. Each of these rolls is mounted upon a shaft 33 to which the roll is fixed and the shafts are mounted each to turn in boxes 34 at the opposite ends thereof. The roll 31 is a non-adjustable roll, while the rolls 30 and 32 arranged on opposite sides of the roll 31 are adjustable relatively to it. As a mounting for the boxes 34 and to the end that the rolls 30 and 32 may be adjustable, the opposite sides of the tank are each provided on the top thereof rising therefrom with a rectangular frame comprising a bottom rail 35, a top rail 36 and connecting end pieces 37, respectively. All the boxes 34 are mounted upon and between the respective rails. The boxes providing bearings for the shaft of the roll 31 are fixed to the rails in any suitable manner, while the boxes providing bearings for the shafts of the other rolls 30 and 32 are slidable upon the rails acting as guides therefor. Connecting with the boxes of the adjustable rolls are adjusting screws 38 which extend through and turn within the end pieces 37 of the frame and are each turned by a hand wheel 38'. By the turning of the screws 38 the rolls 30 and 32 will be made to occupy any determinate engaging relation to the roll 31 when the screws may be locked in position by means of locking nuts 39 thereon tightening against the end pieces 37.

Figure 7:
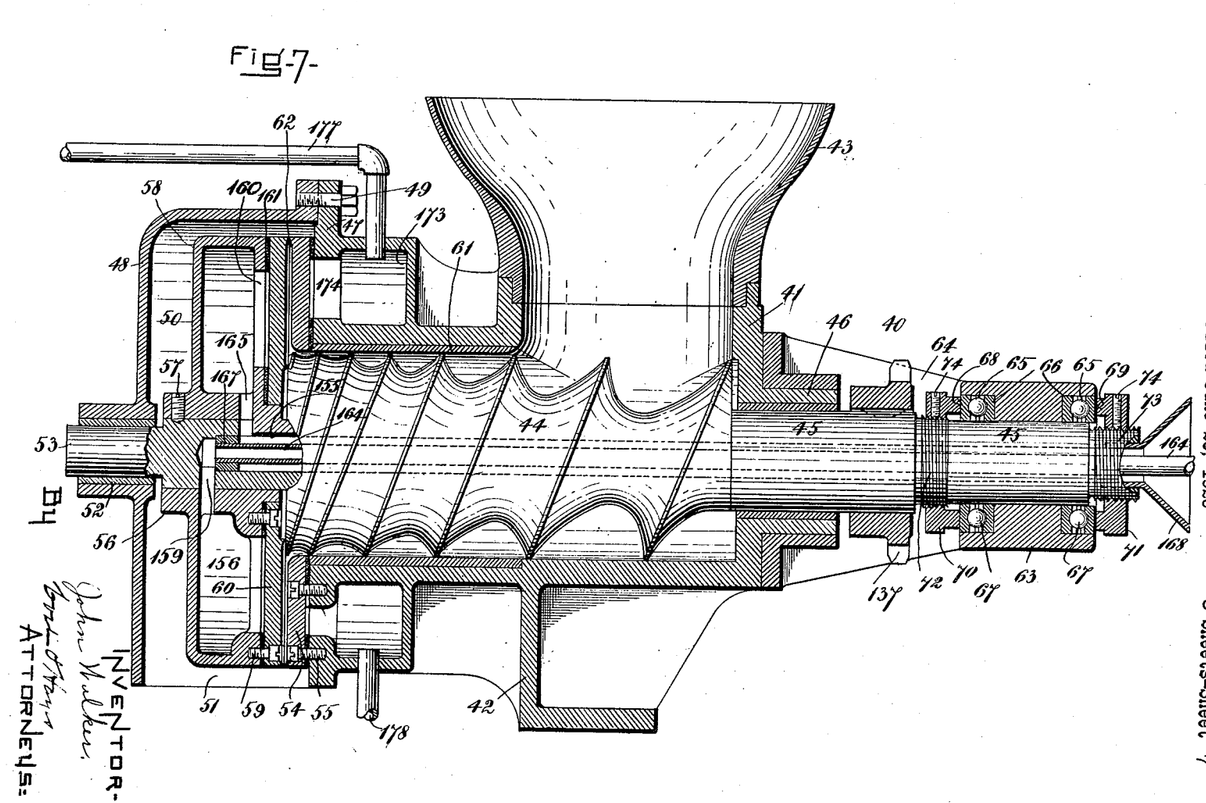

Mounted also upon the top of the tank are one or more, and preferably a pair of grinders 40. Each of these grinders has a casing 41 which forms its body (see Fig. 7). The two casings are arranged in line with one another on the opposite sides of the tank and are secured thereto each by a connecting bracket 42 formed preferably integral with the casing. Upon its upper side each of the casings has a hopper 43 which opens onto a feed screw 44 which turns within the casing. Projecting from the outer end of this feed screw is a shaft 45 which turns within a bearing 46 on the outer side or end of the casing. At its inner end the casing is provided with an annular flange 47 to which is secured a casing extension 48 by suitable fastenings 49. The extension 48 to the casing forms a chamber 50 within it beyond the inner end of the feed screw and closes the inner end of the casing excepting for an opening 51 at the bottom which leads directly into the interior of the tank, the arrangement of the grinders on the opposite sides of the tank being such that the inner end of each of the grinders will project inwardly over the interior of the tank. The extension 48 carries a bearing 52 and projecting from the inner end of the feed screw 44 is a shaft 53 which turns within this bearing. The annular flange 47 on the casing lies just outwardly removed from the inner end of the feed screw 44 which projects slightly into the chamber 50 of the extension 48. Encircling the inner end of the feed screw thus projecting is a grinding disk 54 which is secured to the outer face of the annular flange 47 by screw fastenings 55. Embracing the shaft 53 beyond the inner end of the feed screw within the chamber 50 is a hub 56 which is secured to the shaft by a binding screw 57. The hub 56 has secured to it and formed preferably integral with it a hollow ring 58 which projects outwardly into the chamber 50. Encircling the hub 56 and secured to the outer face of the ring 58 by screw fastenings 59 is a grinding disk 60 which co-operates with the disk 54 in effecting the grinding operation. In this connection it will be observed that the grinding disk 54 is a fixed disk while the grinding disk 60 is a rotary disk being rotated as the feed screw and shaft 53 are rotated. The two disks are provided with the customary serrated faces for obtaining the grinding effect as the disk 60 is rapidly rotated. In the operation of the device material entering the grinder by way of the hopper 43 will be fed by the screw 44 through the casing and will enter between the grinding disks. That portion of the casing by and through which material is fed by the feed screw before entering between the grinding disks is reinforced by an internal sleeve 61 of hardened metal. Material entering between the grinding disks and pulverized by them will, after such effect has been obtained, be projected outwardly by centrifugal force through an opening 62 left between the peripheral edges of each of the disks beyond the grinding surfaces thereof and will enter the chamber 50. In this connection it will be observed that the outer peripheral edges of both of the disks 54 and 60 lie inwardly removed from the wall of the casing extension 48 and consequently material propelled outwardly from between the disks will enter the chamber 50 and thence fall by gravity out of this chamber through the bottom opening 51 into the tank. Requisite nicety is obtained in the adjustment of the disk 60 with relation to the cutting disk 54 for obtaining any desired variation in the grinding effect upon the material, and endwise displacement of the feed screw and its connecting shafts prevented, by an adjustable end-thrust bearing located at the outer end of each grinder. This comprises a fixed block 63 which embraces the outer end of the shaft 45 and is carried by a yoke 64 secured to the casing or body of the grinder. Cut in the opposite ends of this block adjacent the shaft 45 are annular slots 65 each of which contains an annular box 66 on which run ball bearings 67. Engaging these bearings and running thereon are annular thrust bearings 68 and 69, respectively, carried by rings 70, 71 arranged adjacent the opposite ends of the block 63 and threaded to turn adjustably on the respective threaded portions 72 and 73 on the shaft 45, the rings each being secured in any adjusted position by a set screw 74. With the parts thus arranged and with the rings 70 and 71 fixed to the shaft and the thrust bearings 68 and 69 turning in the ball bearings 67 relatively to the fixed block 63 as aforesaid, the block will operate to prevent any endwise displacement of the rotating feed screw and its connecting shafts. The adjustment of the annular cutting disk 60 is secured through an endwise adjustment of the feed screw and attached shafts to which the cutting disk 60 is fixed. Such adjustment is obtained in one direction or the other by first loosening the rings 70 and 71 by releasing the set screws 74, and then turning these rings in one direction or the other relatively to the block 63, which has the effect of moving the feed screw, connecting shafts and cutting disk 60 in one direction or the other, the disk 60 being moved into any desired adjusted position with relation to its co-operating cutting disk 54, after which the rings 74 are bound to the shaft 45 by the setting of the binding screws 74, and the parts will operate in the adjusted position thus obtained.

Figure 6:
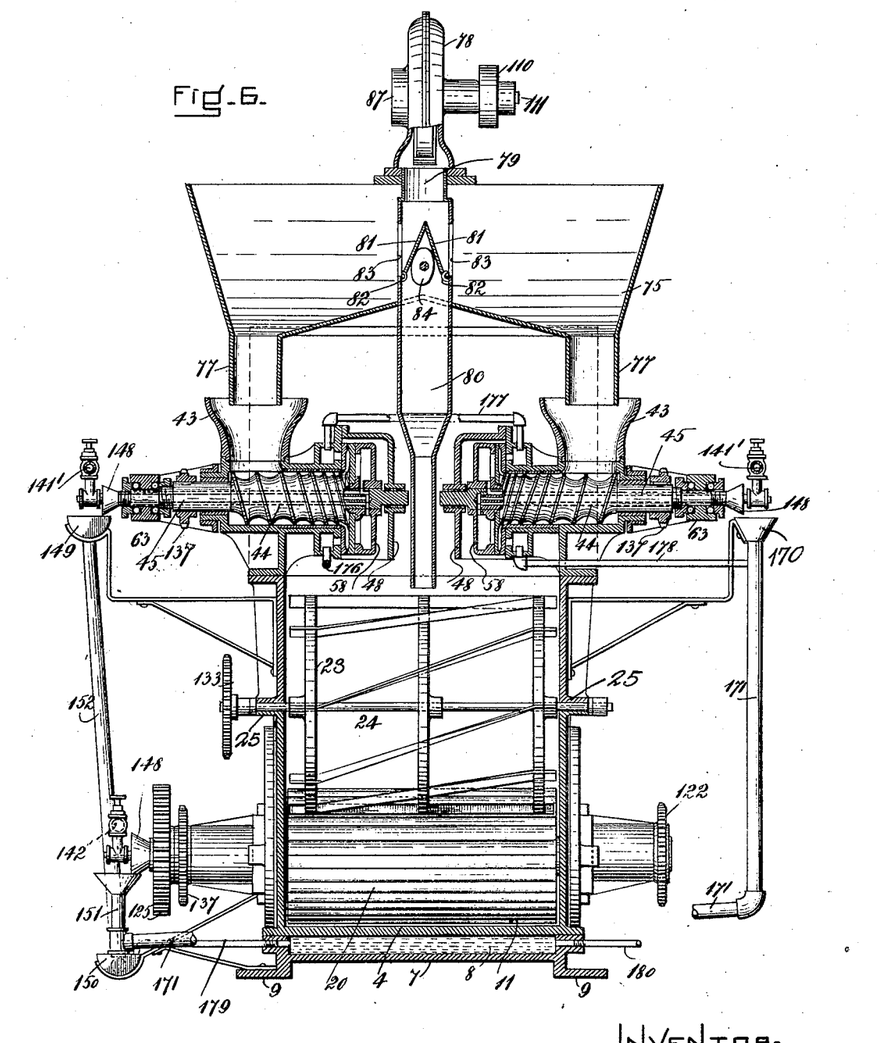
Fig. 6 is a section on the line 6—6 of Fig. 1.

Material directed into the hoppers 43 of the respective grinders is first deposited in a hopper 75 common to both hoppers 43. The hopper 75 is supported upon uprights or braces 76 secured respectively to the sides at one end of the tank (see Figs. 4 and 6). The walls of the hopper 75 are so arranged that material deposited in it will find its way out of the hopper by way of chutes 77 at the opposite ends thereof which lead directly into the hoppers 43 of the respective grinders. Material is fed into the hopper 75 by a centrifugal fan 78 arranged on top of the hopper at about the centre thereof and provided with an outlet 79 opening in the direction of the chamber of the hopper. Leading directly from the outlet 79 of the fan and extending straight down through the bottom of the hopper 75 is a chute 80 the bottom end of which opens directly into the tank. Located inside this chute at a point well above the bottom of the hopper 75 is a butterfly valve having wings 81 which turn on hinges 82 on the opposite sides of the chute. The wings 81 of the valve extend upwardly within the chute and when open are adapted to close openings 83 in the opposite sides of the chute just above the hinges 82 to which the wings are secured and when the wings are thus disposed a clear passage is obtained from the outlet of the fan directly through the chute 80 into the tank. The arrangement of the wings 81 of the valve is such that the wings of the valve will normally gravitate toward each other and meet, assuming a position substantially as shown in Fig. 6 when they operate to close the passage through the chute, and material entering the upper end of the chute from the fan is directed by the wings outwardly in opposite directions through the openings 83 in the chute into the chamber of the hopper 75. The wings 81 of the valve are controlled, being held in an open position closing the openings 83 or allowed to gravitate to a closed position closing the passage through the hopper by means of a cam 84 located between the wings and arranged on the end of a rod 85 journaled to turn upon the walls of the hopper and chute through which the rod extends and which rod is turned by a handle 86.

Material fed into the hopper 75 by the fan 78 and directed either into the tank directly or into the respective grinders and thence into the tank, is dry material and such material is drawn into the fan by the suction developed by the fan, any suitable connection (not shown) connecting with the eye 87 of the fan and leading down into the receptacle from which the material is drawn.

Figure 1:
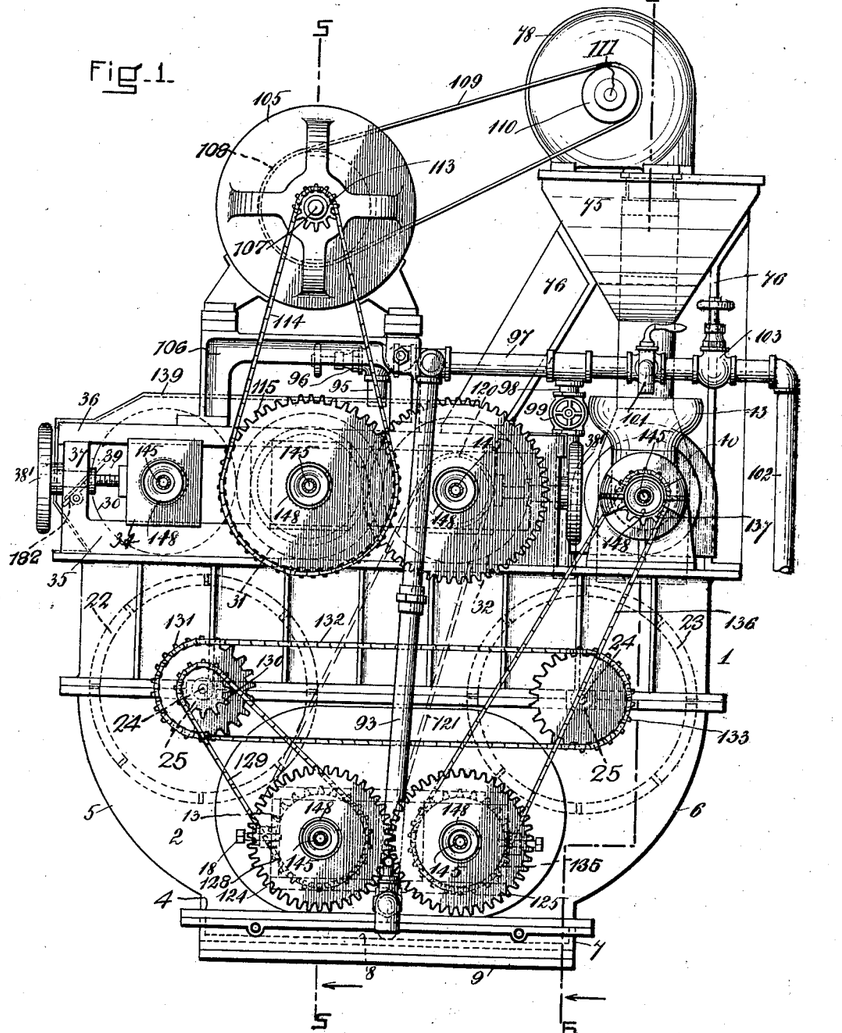
Figure 1 is a front side elevation of the machine.
Figure 2:
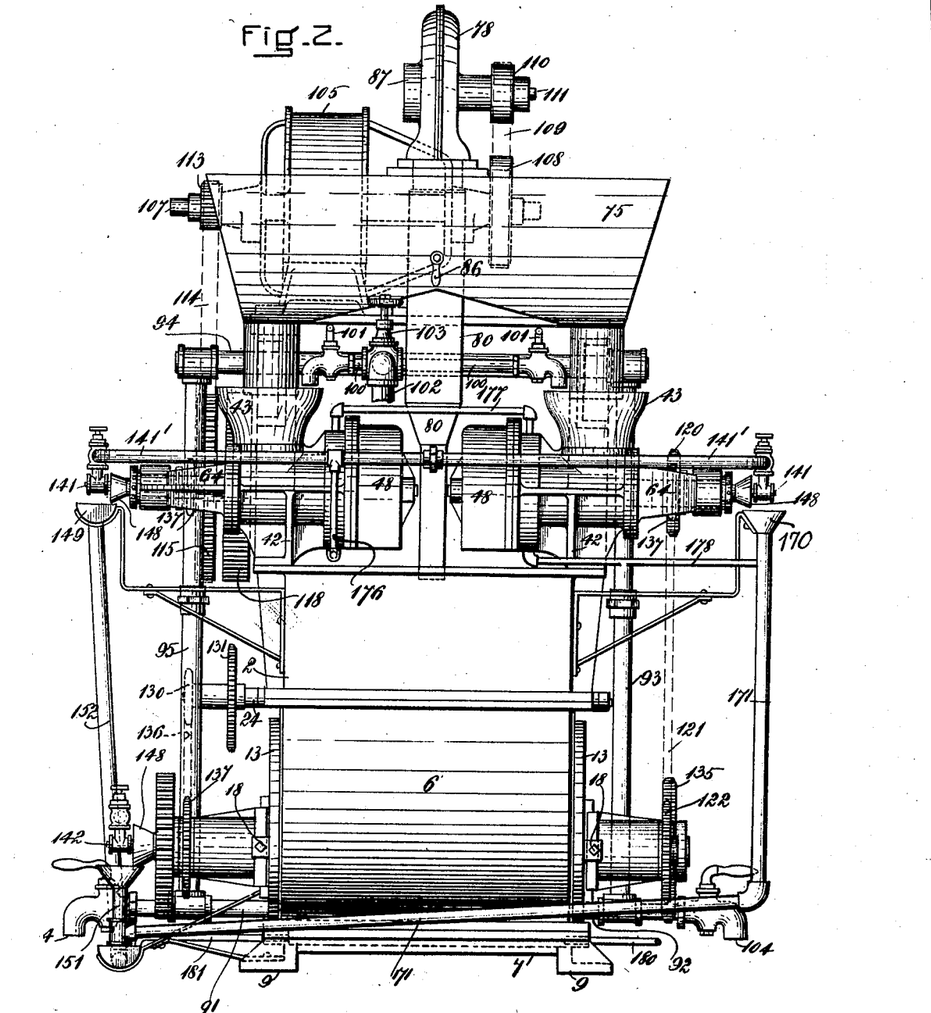
Fig. 2 is an end elevation.
Figure 3:
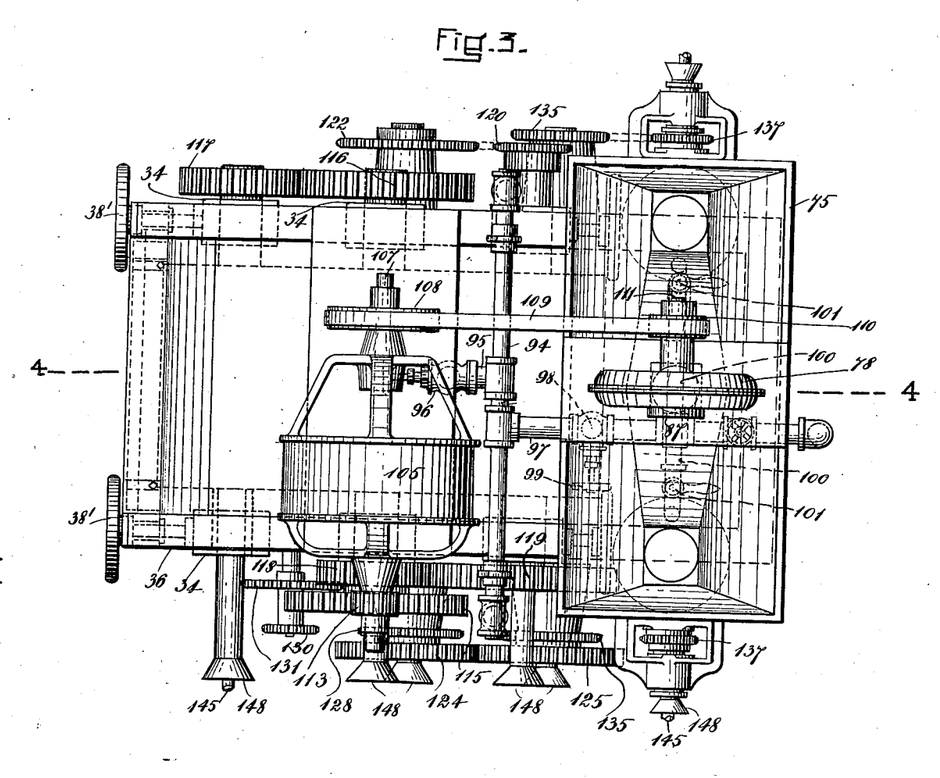
Fig. 3 is a plan.

Reference will now be made to the means by which the liquid content of the tank may be elevated and directed to the milling wheels, to the grinders, or to both milling wheels and grinders at the same time, or otherwise directed as will be explained. Leading from the bottom of the tank through the opposite sides thereof out of a compartment 90 in the bottom of the tank and which is formed by and between the bottom of the tank and the two adjacent toothed rolls 11 and 12, are pipe connections 91 and 92 (see Figs. 2 and 4). These connections are continued upwardly alongside the opposite sides of the tank by pipe connections 93 which rise well above the top of the tank, above the milling rolls and grinders, and are connected by a common pipe connection 94. Extending from the pipe connection 94 is a pipe connection 95 which leads directly to a point between the milling rolls 31 and 32 for depositing material onto these rolls at a point about midway their extension. The pipe connection 95 is controlled by a valve 96 which is located closely adjacent the pipe 94. Extending also from the pipe 94 in a direction opposite to that of the pipe 95 is a pipe 97 leading in a direction over the tank and grinders with extension about midway the two grinders. Leading from the pipe 97 is a pipe 98 which extends downward and opens directly into the tank. Passage through the pipe 98 is controlled by means of a valve 99. Extending also from the pipe 97 laterally in opposite directions are pipes 100 which connect with cocks 101 opening directly into the hoppers 43 of the respective grinders. From the branch of the pipes 100 the pipe 97 is continued and terminates in a draw-off pipe 102 by which the contents of the tank may be drawn off at an elevated point or a point well above the level of its contents in the tank. The draw-off pipe 102 is controlled by a valve 103. With the pipe connections thus provided the liquid content of the tank elevated by way of the pipe 93 from the bottom of the tank, may be directed to the milling rolls only, by opening the valve 96 and closing the valve 98, the cocks 101 and the valve 103. The content may be directed only to the grinding rolls by closing all the valves and leaving open the cocks 101; it may be directed to both milling rolls and grinders simultaneously by closing only the valves 98 and 103; it may be directed back into the tank by closing all of the valves and cocks with the exception of the valve 98; it may be deposited outside the tank by closing all of the valves and cocks with the exception of the valve 103. In other words, the arrangement is such as to permit of the disposition of the liquid content of the tank as may be desired. In case it is desired to draw off the liquid content of the tank at a point adjacent the bottom of the tank this is provided for by means of draw-off cocks 104 which connect directly with the pipe fittings between the respective pipes 91, 92 and the pipes 93. That is, the liquid content may be drawn off if desired by gravity from the bottom of the tank.

The elevation of the liquid content of the tank through the pipes 93, and the disposition thereof in various directions for processing, as explained above, or for the purpose of being drawn off in an elevated position, is obtained by means of the operation of the toothed rolls 11 and 12 acting as a pump. As these rolls are rotated in the operation of the machine in the direction of the arrows shown thereon, the liquid content of the tank will be projected outwardly through the pipes 91 and 92 and upwardly through the pipe 93 and pipes connecting therewith with great force, such force depending upon the rapidity with which the rolls 11 and 12 are rotated. Evidently the reason for this is that the rolls 11 and 12, turning as they do very close to the bottom and sides of the tank, effect such compression of the contents within the chamber 90 as to cause elevation of the liquid and its passage through the various pipe connections.

Reference will now be made to the mechanism by which all of the running parts of the machine are connected to be operated from a single source of power. The machine is operated by means of a motor 105 mounted upon a support 106 which is fixed to the top rails 36 of the frame which supports the milling rolls 30, 31 and 32. 107 is the motor shaft. At one end this shaft carries a pulley 108 which connects by a belt 109 with a pulley 110 on the shaft 111 of the fan 78 for operating the fan. At its opposite end the shaft 107 of the motor carries a sprocket wheel 113 connected by a sprocket chain 114 with a sprocket wheel 115 on the shaft 33 of the milling roll 31 for turning this roll. The shaft 33 bears at one end a gear 116, which meshes with a gear 117 on the shaft 33 of the milling roll 30 for turning this roll. The relation of the gears 116 and 117 is such that the milling roll 30 will be turned faster than the milling roll 31 from which it is operated. At its opposite end lying just back of the sprocket wheel 115 the shaft 33 of the milling roll 31 bears a gear 118 which meshes with a gear 119 on the shaft 33 of the milling roll 32 for operating this roll. The relation of the gears 118 and 119 is such that the milling roll 32 will be turned more slowly than the milling roll 31 from which it is operated.

The shaft 33 of the milling roll 32 carries a sprocket wheel 120 connected by a sprocket chain 121 with a sprocket wheel 122 on the shaft 12 of the combined grinding and milling roll 10 for operating this roll. The relation of the sprocket wheels 120 and 122 is such that the roll 10 will be turned more slowly than the milling roll 32 from which it is operated. The shaft 12 of the roll 10 bears a gear 124 which meshes with a gear 125 on the shaft 12 of the combined grinding and milling roll 11 for operating this roll. The relation of the gears 124 and 125 is such that the rolls 10 and 11 will operate at the same rate of speed, one operating from the other.

The shaft 12 of the roll 10 carries a sprocket wheel 128 which connects by a sprocket chain 129 with a sprocket wheel 130 on the shaft 24 of the combined stirrer and beater 22 for operating it. The relation of the sprocket wheels 128 and 130 is such that the stirrer and beater 22 will be turned faster than the roll 10 from which it is operated. The shaft 24 of the stirrer and beater 22 bears a sprocket wheel 131 connecting by a sprocket chain 132 with a sprocket wheel 133 on the shaft 24 of the stirrer and beater 23 for operating it. The relation of the sprocket wheels 131 and 133 is such that the stirrers and beaters 22 and 23, respectively, will be operated at the same rate of speed. The shaft 12 of the combined grinding and milling roll 11 bears at its opposite ends sprocket wheels 135 which connect, respectively, by chains 136 with sprocket wheels 137 on the shafts 45 of the respective grinders for operating them. The relation of the sprocket wheels 135 and 137 is such that the grinders will be operated at a speed slightly in excess of the speed of the roll 11 from which the grinders are operated or at any desired speed effected by relative change in the size of the respective sprocket wheels.

To prevent escape of the contents of the tank during the operation of the milling rolls, the tank is preferably provided with a sheet metal cover 139 which rests upon the top of the tank fitting over said rolls.

Figure 8:
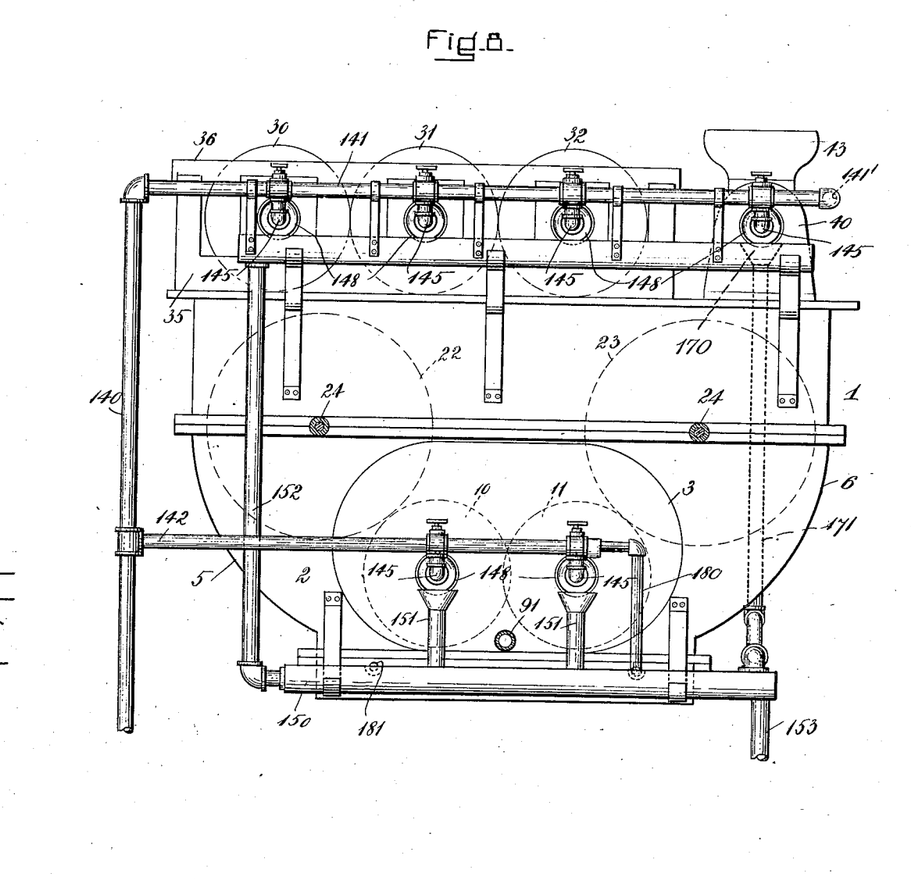
Fig. 8 is a front side elevation of a portion of the machine showing the arrangement of certain elements entering into its cooling system.

Reference will now be made to the circulatory system by which the combined grinding and milling rolls 10 and 11, the milling rolls 30, 31 and 32 and the respective grinders 40 are kept cool during the running of the machine or in proper operative condition and by which system, also, the contents of the tank may be maintained at any desired temperature. 140 (see Fig. 8) is an inlet pipe through which water at any desired temperature is directed to pass. Extending laterally from this pipe are branch pipes 141 and 142. Both these branch pipes extend by one side of the machine, the pipe 141 being also extended around the machine to the opposite side thereof by an extension 141'. The branch pipe 141 lies just above the ends of the shafts to the milling rolls 30, 31 and 32, including also the shaft to one of the grinders 40, while the pipe 142 lies just above the ends of the shafts of the combined grinding and milling rolls 11 and 12. All of the rolls are hollow rolls and water from the branch pipes 141 and 142 is directed to enter and pass through the respective rolls and exit therefrom in a manner common to all the rolls.

Figure 5:
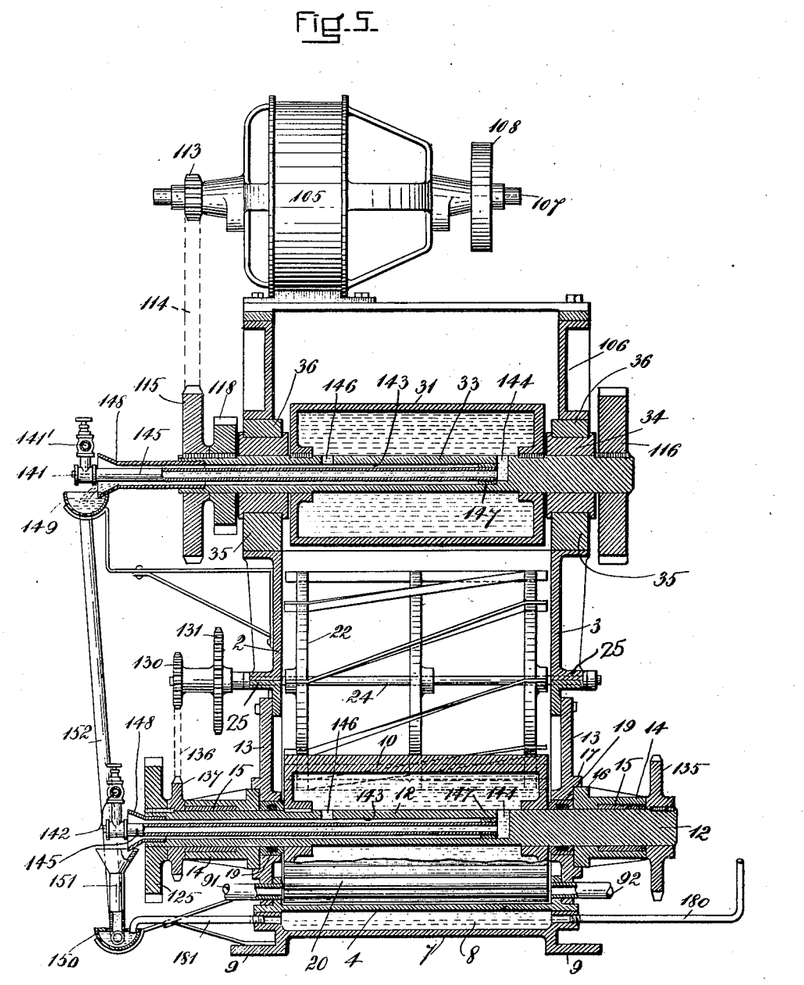
Fig. 5 is a section on the line 5—5 of Fig. 1.

To this end the shaft bearing each one of the rolls is hollow in part being provided with an opening 143 (see Fig. 5). This opening extends from the end of the shaft and for a considerable distance into and along the shaft where the opening communicates with the chamber of the roll by a by-pass 144. Extending through the openings 143 in the several shafts are inlet pipes 145 which connect, respectively, with one or the other of the branch pipes 141, 142. Each of the pipes 145 is a stationary pipe and is smaller in diameter than the diameter of the opening through the shaft of the roll through which it extends, leaving a clearance between the exterior of the pipe and the surrounding wall of the opening in the shaft and this is in communication with the chamber of the roll by way of a by-pass 146. The end of each of the pipes 145 opens into the end of the opening in the shaft just adjacent the by-pass 144 so that water entering by way of the pipe 145 will pass into the chamber of the roll and thence escape back by way of the by-pass 146 into the hollow of the shaft and escape through the end of the shaft. In order that water entering by way of the pipe 145 may pass directly into the chamber of the roll and not escape back through the opening around the pipe, a seal 147 is provided between the end of the pipe and the surrounding wall of the shaft. In the end of each shaft is placed a funnel 148 forming an extension of the opening through the shaft so that water directed into the roll and escaping from the chamber thereof by way of the opening in the shaft will pass through the funnel 148 and be directed into a trough leading to a drain. 149 is the trough into which the water is immediately directed from the funnels on the shafts of the milling rolls 30, 31, 32, and 150 is the trough into which water is directed from the funnels on the shafts of the combined grinding and milling rolls 11 and 12 through connecting funnels 151. Water escaping into the trough 149 runs into the trough 150 by way of a connecting pipe 152 and the trough 150 has an escape or drain pipe 153.

Water is directed into the respective grinders especially for keeping cool certain of the grinding disks in substantially the same manner that it is directed to the respective rolls as above explained.

The feed screw 44 and shaft 45 of each of the grinders has an opening 155 extending through it and the opening extends for a short distance into the shaft 53 of the grinder where it communicates with the chamber 156 of the ring 58 by way of a by-pass 159 extending through the hub 56 on the shaft 53. The chamber 156 of the ring 58 opens directly onto the grinding disk 60 by an annular opening 160 in the outer face of the ring 58 to which the grinding disk 60 is secured, a seal 161 being provided around the opening 160 and between the outer face of the ring and the grinding disk to prevent escape of water. Extending through the opening 155 in the feed screw and shafts of each of the respective grinders is a pipe 164. These pipes for the respective grinders connect respectively with the water inlet pipes 141 and 141'. Each of the pipes 164 is a stationary pipe and is smaller in diameter than the diameter of the opening 155 through which it extends, leaving a clearance between the exterior of the pipe and the surrounding wall of the opening and this is in communication with the chamber 156 of the hollow ring 58 by way of a by-pass 165. The end of each of the pipes 164 opens into the end of the opening 155 located within the shaft 53 just adjacent the by-pass 159 so that water entering by way of the pipe 164 will pass into the chamber 156 of the hollow ring 58 (with access to the grinding disk 60) and thence escape from the chamber 156 back by way of the by-pass 165 into the hollow of the shaft and through the end of the shaft. In order that water entering by way of the pipe 145 may pass directly into the chamber of the ring 58 and not escape back through the opening around the pipe, a seal 167 is provided between the end of the pipe and the surrounding wall of the shaft 53. In the end of each of the shafts 45 is placed a funnel 168 forming an extension of the opening through the shaft so that water directed into the grinder and escaping therefrom by way of the opening 155 will pass through the funnel 168 and be directed into a trough leading to a drain. The funnel 148 of one of the grinders empties directly into the trough 149. The funnel 148 of the other grinder empties directly into a funnel 170 which is connected by a pipe 171 with the trough 150 connecting with the drain as previously explained.

For cooling the grinding disks 54 of the respective grinders an annular compartment 173 is built around each one of the disks. This compartment is built in the casing of the grinders and preferably forms an integral part of the casing. The compartment is closed except in the side facing the disk so that water entering the chamber of the compartment has direct access to the disk for keeping it cool. Water is directed to the chamber of the compartment 173 of one of the grinders by way of a pipe 176 from the pipe 141 which enters the compartment at the bottom (see Fig. 6). From thence it passes out of this compartment at the top and enters the top of the compartment 173 of the other grinder by way of a pipe 177. It then outlets and escapes from this compartment at the bottom by way of a pipe 178 leading into the pipe 171 which connects with the drain.

Water is directed into the chamber 8 adjacent the bottom of the tank by way of an inlet pipe 180 which connects with the pipe 142. The water outlets from the compartment 8 by way of a pipe 181 which connects with the drain.

In the general operation of the machine all materials requiring grinding are picked up by the fan and passed through the respective grinders before entering the tank. Dry materials requiring no grinding may be picked up by the fan and passed directly into the tank by way of the chute 80, the wings 81 of the valve inside the chute being opened to clear the chute but close the openings 83 leading from it. When liquor is to be made from cocoa beans, the beans require no preliminary roasting or treatment apart from cleaning and the removal of their shell. The initial passage of the beans through the grinders tends to produce a liquor and the subsequent maceration of the ground beans by the grinding and milling rolls 10 and 11 soon produces a liquor capable of being elevated by the operation of these rolls and circulated through the grinders or milling rolls or both at the same time as may be desired. For the purpose of keeping clean the milling rolls and for the purpose also of returning material acted upon by the milling rolls back into the tank, the milling roll 30 is provided with a scraper 182. This scraper is mounted upon the end posts 37 of the frame on which the milling rolls are mounted to turn.

Reference has already been made to the adaptability of the machine with relation to the circulation of liquid masses which may be repeatedly passed through the grinders or milling rolls or both simultaneously by the operation of the rolls 10 and 11, at the same time being subjected to the grinding and milling effect induced by the teeth of these rolls engaging and rubbing on one another.

What is said above of cocoa beans is true of all ingredients entering into the mass requiring processing; all may be treated in the same machine.

All elements of the machine having a grinding or milling effect upon the ingredients are kept cool or sufficiently cool so as not to injure the ingredients acted upon by them.

Water sufficiently hot to produce a slow cooking of the mass may be passed through the water circulatory system.

Tempering of the mass is effected essentially by the passage of water at a required low degree of temperature through the rolls 10 and 11 and through the chamber 8 adjacent the bottom of the tank. During the tempering the mass is kept agitated by the operation of the rolls 10 and 11 which are substantially self-clearing, and after a proper tempering of the mass has been effected, the tank may be drained by the combined operation of these rolls, the contents of the tank being, in other words, pumped out by way of the draw-off pipe 102.

Having thus fully described my invention I claim and desire to secure by Letters Patent of the United States:—

1. In a machine for treating chocolate masses and other materials, the combination comprising a tank, processing mechanism arranged whereby material within the tank elevated and fed to said mechanism will circulate back into the tank, and means arranged within the tank and functioning both to assist in the processing of material therein and to assist in elevating and feeding material within the tank back to said processing mechanism whereby the material will circulate as aforesaid.

2. In a machine for treating chocolate masses and other materials, the combination comprising a tank, milling rolls arranged whereby material within the tank elevated and fed to said rolls will circulate back into the tank, and means arranged within the tank and functioning both to assist in the processing of material therein and to assist in elevating and feeding material within the tank back to said milling rolls whereby the material will circulate as aforesaid.

3. In a machine for treating chocolate masses and other materials, the combination comprising a tank, milling rolls arranged whereby contents of the tank elevated and fed to said rolls will circulate back into the the tank, a grinder arranged whereby contents of the tank elevated and fed to said grinder will circulate back into the tank, and means whereby contents of the tank may be elevated and fed to said milling rolls or grinder or both simultaneously.

4. In a machine for treating chocolate masses and other materials, the combination comprising a tank, milling rolls arranged whereby contents of the tank elevated and fed to said rolls will circulate back into the tank, a grinder arranged whereby contents of the tank elevated and fed to said grinder will circulate back into the tank, a pipe leading from the body of the tank with extension to said milling rolls and grinder respectively whereby the contents of the tank may be fed to said milling rolls and grinder, means for controlling the passage of the contents of the tank to the milling rolls and grinder respectively, and means whereby the contents of the tank may be elevated through said pipe to circulate as aforesaid.

5. In a machine for treating chocolate masses and other materials, the combination comprising a tank, milling rolls arranged whereby contents of the tank elevated and fed to said rolls will circulate back into the tank, a grinder arranged whereby contents of the tank elevated and fed to said grinder will circulate back into the tank, a pipe leading from the body of the tank with extension to the milling rolls and grinder respectively whereby the contents of the tank may be fed thereto, and means located inside the tank whereby the contents of the tank may be elevated through said pipe to circulate as aforesaid.

6. In a machine for treating chocolate masses and other materials, the combination comprising a tank, milling rolls arranged whereby contents of the tank elevated and fed to said rolls will circulate back into the tank, a grinder arranged whereby contents of the tank elevated and fed to said grinder will circulate back into the tank, a pipe connecting with the body of the tank and extending upwardly outside the tank with extension to said milling rolls and grinder respectively whereby the contents of the tank elevated through said pipe may be fed to said milling rolls and grinder, a pump located within the tank for elevating the contents thereof through said pipe, and means for operating said milling rolls, grinder and pump.

7. In a machine for treating chocolate masses and other materials, the combination comprising a tank, milling rolls arranged whereby contents of the tank elevated and fed to said rolls will circulate back into the tank, a grinder arranged whereby contents of the tank elevated and fed to said grinder will circulate back into the tank, a pipe leading from the body of the tank upwardly with extension to the milling rolls and grinder respectively and with an outlet also directed back into the tank, a valvular control whereby the contents of the tank may be directed to the milling rolls, to the grinder or to both simultaneously or directed back into the tank, and means for elevating the contents of the tank through said pipe.

8. In a machine for treating chocolate masses and other materials, the combination comprising a tank, a pipe leading from the body of the tank whereby the contents thereof may be elevated to a point above the level of the contents of the tank, a set of toothed rolls located within the tank and functioning to elevate the contents of the tank through said pipe as the rolls are operated, and means for operating said rolls.

9. In a machine for treating chocolate masses and other materials, the combination comprising a tank, milling rolls arranged whereby material within the tank fed to said rolls will circulate back into the tank, a pipe leading from the body of the tank with extension to said milling rolls whereby material elevated through said pipe will be fed to said rolls and thence circulate back into the tank, and a set of toothed rolls located within the tank and functioning to elevate the contents of the tank through said pipe to circulate as aforesaid as the rolls are operated and means for operating said rolls.

10. In a machine for treating chocolate masses and other materials, the combination comprising a tank, a grinder arranged whereby material within the tank fed to said grinder will circulate back into the tank, a pipe leading from the body of the tank with extension to said grinder whereby material elevated through said pipe will be fed to said grinder and thence circulate back into the tank, and a set of toothed rolls located within the tank and functioning to elevate the contents of the tank through said pipe to circulate as aforesaid, and means for operating said rolls.

11. In a machine for treating chocolate masses and other materials, the combination comprising a tank, milling rolls arranged whereby material within the tank fed to said rolls will circulate back into the tank, a grinder arranged whereby material within the tank fed to said grinder will circulate back into the tank, a pipe leading from the body of the tank with extension to said milling rolls and grinder respectively, and set of toothed rolls co-operating with one another for acting upon the material in said tank and functioning also to elevate the material in the tank through said pipe whereby it may circulate through said milling rolls and grinder as aforesaid, and means for operating said rolls.

12. In a machine for treating chocolate masses and other materials, the combination comprising a tank, milling rolls arranged whereby material elevated and fed to said rolls will circulate back into the tank, a grinder arranged whereby the contents of the tank elevated and fed to said grinder will circulate back into the tank, a pipe connecting with the tank at the bottom thereof and leading upwardly by the tank on the outside thereof with extension to said milling rolls and grinder respectively, valvular means for controlling the feed of the contents of the tank to the milling rolls and grinder, a set of toothed rolls located in the bottom of the tank for acting upon the material therein and functioning also to elevate the material in the tank through said pipe whereby it may circulate as aforesaid, and means for operating said rolls.

13. In a machine for treating chocolate masses and other materials, the combination comprising a tank, toothed rolls in mesh arranged adjacent the bottom and sides of said tank whereby a chamber is formed between said rolls and the adjacent bottom and sides of the tank, means whereby water may be circulated through said rolls, a jacket in the bottom of the tank beneath said rolls and at the bottom of said chamber, and means whereby water may be circulated through said jacket.

14. In a machine for treating chocolate masses and other materials, the combination comprising a tank, toothed rolls in mesh arranged within the tank whereby a chamber is formed between the rolls and the tank, a pipe leading out of said chamber, and means for operating the rolls.

15. In a machine for treating chocolate masses and other materials, the combination comprising a tank, toothed rolls in mesh arranged adjacent the bottom and sides of the tank whereby a chamber is formed by and between the bottom and sides of the tank and the adjacent rolls, a pipe leading out of said chamber, and means for operating the rolls.

16. In a machine for treating chocolate masses and other materials, the combination comprising a tank, processing mechanism arranged whereby material fed thereto and processed thereby will enter the tank, a connection leading from the body of the tank back to said processing mechanism, and means located within the tank and functioning to assist in the processing of material therein and functioning also to return material in the tank back to said processing mechanism through said connection.

17. In a machine for treating chocolate masses and other materials, the combination comprising a tank, a grinder arranged whereby material fed to the grinder and processed thereby will enter the tank, milling rolls arranged whereby material fed to said rolls and processed thereby will circulate back into the tank, a connection leading from the body of the tank back to said grinder and also to said milling rolls, and means located within the tank for returning material therein back to the grinder and also to the milling rolls through said connection.

18. In a machine for treating chocolate masses and other materials, the combination comprising a tank, a grinder arranged whereby material fed to the grinder and processed thereby will enter the tank, milling rolls arranged whereby material fed to said rolls and processed thereby will circulate back into the tank, a connection leading from the body of the tank back to said grinder and also to said milling rolls, and means located within the tank functioning to assist in the processing of material entering the tank and functioning also to return material therein back to the grinder and also to the milling rolls through said connection.

19. In a machine for treating chocolate masses or other materials, the combination comprising a tank for containing the mass to be treated, hollow toothed rolls in mesh arranged within the tank, the teeth upon said rolls being rounded teeth with rounded interdental spaces between them whereby the teeth will engage one another with a wiping action to mill the ingredients in the contained mass as the rolls are operated by an application of power to one of the rolls, means for applying power to said one of the rolls and means for circulating water through the rolls.

JOHN WALKER.